Patented Nov. 21, 1944

2,363,252

UNITED STATES PATENT OFFICE 2,363,252

DERIVATIVES OF HYDROGENATED ROSIN

William J. Kirkpatrick, Marshallton, Del., assignor to Hercules Powder Company, Wilmington, Del., a corporation of Delaware No Drawing. Application October 4, 1943, Serial No. 504,926

9 Claims. (Cl. 260—100)

This invention relates to a process for the separation of colloidal noble metal from hydrogenated rosin; it also relates to a process for the separation of crystalline hydro rosin acids from hydrogenated rosin and to the improved products formed thereby.

The art is acquainted with the fact that the various rosins may be hydrogenated by reacting the same, preferably in solution in an inert solvent, with hydrogen in the presence of an active noble metal catalyst, such as, platinum, palladium, iridium, rhodium, osmium and ruthenium. The noble metal catalytic process for rosin hydrogenation is a desirable one as compared with the use of base metals since the former process enables operation at temperatures and pressures which are close to atmospheric. However, despite these advantages, the process does not possess economic feasibility inasmuch as there is considerable catalyst loss in the process. In use, noble metal catalysts have a tendency to become colloidal; and in such form they are carried along with the solution being hydrogenated and are retained by the hydrogenated rosin recovered therefrom. This colloidal noble metal has heretofore not been recoverable by any simple and convenient method.

Now, in accordance with this invention, it has been found that by a unique, but relatively simple, procedure, it is possible to effect a separation of the colloidal noble metal from hydrogenated rosin. At the same time it has been found that as a result of this procedure, two novel materials are produced, one a material consisting of crystalline hydro rosin acids, the other an improved hydrogenated rosin of low ash content, good stability to oxidation and decomposition and having no crystallizing tendencies.

In accordance with the invention, then, rosin which has been at least partially saturated with hydrogen in contact with a noble metal catalyst is subjected to the action of a low boiling saturated hydrocarbon containing between 3 and 8 carbon atoms, utilizing a ratio of hydrocarbon to hydrogenated rosin of at least 1.0. After the materials have been agitated at a suitable temperature until there is no further dissolution taking place or until a homogeneous solution is obtained, the crystalline hydro rosin acids may be obtained in one of several manners. The crystalline rosin acids may precipitate immediately upon the dissolution of the original hydrogenated rosin. The crystalline product can be removed by any convenient method as by filtration, decantation, etc. In some instances, however, depending upon the temperature employed for the dissolution and the degree of hydrogenation of the rosin employed, a homogeneous solution may be obtained. In such case, the solution will be cooled to a temperature low enough to induce crystallization, as for example, 30° C. or therebelow. Upon cooling the solution, the hydro rosin acids will crystallize out spontaneously, or they may be obtained by seeding the cooled solution with, for example, a small amount of crystalline hydro rosin acids. After the crystalline rosin acids have been removed, the remaining solution may be treated to remove the hydrocarbon solvent. The product is an improved hydrogenated rosin which is free of crystallizing tendencies, has a low ash content and good stability to oxidation.

In carrying out the procedure described, it has been found that all of the colloidal noble metal contained in the original hydrogenated rosin becomes occluded in the crystalline hydro rosin acids. Thus, by removing the crystalline hydro rosin acids, a separation of the noble metal from the remaining hydrogenated rosin is effected. In this manner, an improved hydrogenated rosin free of crystallizing tendencies and substantially free of noble metal may be obtained from the solution remaining after the crystalline hydro rosin acids have been removed.

Since the crystalline hydro rosin acids obtainable from hydrogenated rosin normally amounts to approximately 25% by weight, the above-described process results in a considerable concentration of the colloidal noble metal contained in the original hydrogenated rosin. As desired, then, the colloidal noble metal contained in the crystallized hydro rosin acids may be removed by any desirable means, preferably by contacting the crystallized hydro rosin acids dissolved in a water-immiscible hydrocarbon or halogenated hydrocarbon solvent with an activated carbon. The noble metal itself can be obtained from the activated carbon by ignition.

There follows a specific example which illustrates a particular embodiment of the processes of this invention which, however, is not to be taken as being limiting. All parts and percentages in this specification and claims are by weight unless otherwise indicated.

Example I

Three hundred eighteen parts of N wood rosin, dissolved in 952 parts of a solvent consisting of 40% isopropyl ether and 60% acetic acid, were hydrogenated at a temperature of 25 to 50° C.

and at a pressure of 58 pounds per sq. in. in contact with a platinum oxide catalyst supported on true tripoli. The recovered hydrogenated rosins showed a hydrogen saturation of 80% of the theoretical and had a platinum content as determined by spectrographic analysis of more than 5.0 parts per million. This hydrogenated rosin was then ground to a fine powder and stirred into 500 parts of petroleum ether while maintaining a temperature of 27° C. therein. Most of the hydrogenated rosin dissolved at once; however, the hydro rosin acids soon started to crystallize out. When there was no further dissolution of the undissolved material taking place and the crystalline hydro rosin acids were in equilibrium with the liquid phase, agitation was discontinued. The vessel containing the mixture was then allowed to stand at approximately 0° C. for four hours to permit further crystallization of hydro rosin acids. The hydro rosin acids were then filtered from the solution, washed with petroleum ether and dried. Sixty-seven and one-half parts of crystalline hydro rosin acids remained. The crystalline product was converted to the resinous state by melting the crystals and allowing them to solidify. The resinous product had a color of X+ on the rosin scale, a melting point by the ball and ring method of 93.5° C. and an acid number of 181.

The petroleum ether solution obtained above, after removal of the hydro rosin acids, was subjected to distillation to remove the petroleum ether, 250 parts of a resinous, non-crystalline material being obtained. This hydrogenated product exhibited no tendency towards crystallization. It had a color of M on the rosin scale, a melting point by the drop method of 64° C. and an acid number of 162. The ash content of this product was 0.00% as compared with 0.04% for the original hydrogenated rosin employed. Spectrographic analysis of the product showed that it contained less than 0.5 part per million of platinum.

Fifty parts of the crystalline hydro rosin acids were then dissolved in 450 parts of hexane by heating under reflux. The heating was continued until any dissolved oxygen had been removed. Then, 2.5 parts of an activated carbon which had been activated by blowing air over wood charcoal at about 800° C. (commercially known as Norit) were added to 50 parts of hexane and the mixture refluxed for 30 minutes. Thereafter, the hydrogenated rosin solution was added to the Norit-hexane mixture and the resulting mixture heated for 30 minutes. The activated carbon was then removed. Crystalline hydro rosin acids separated from the solution as the temperature approached 20° C. The product showed a platinum concentration of less than 0.5 part per million by spectrographic analysis.

Any hydrogenated wood or gum rosin may be utilized in accordance with the herein-described processes, also rosins which have been subjected to various refining processes either before or after hydrogenation, as for example, treatment with selective color body absorbents as furfural, furfuryl alcohol, etc., treatment with selective color body adsorbents as fuller's earth, etc. The hydrogenated rosins employed will, however, be those hydrogenated by contacting rosin with one of the noble metal catalysts hereinbefore mentioned. These noble metal catalysts may be employed in the elemental form or in combined form such as the oxide, etc. and reduced to the active elemental form during hydrogenation.

The hydrogenated rosins employed may be of varying degree of hydrogen saturation, it being preferred to employ those rosins saturated to the extent of at least 25% of the theoretical. Unless rosins of 25% or more hydrogen saturation are employed unsubstantial amounts of crystalline hydro rosin acids are obtained. The preferred hydrogenated rosins are those having at least 50% hydrogen saturation.

In place of the petroleum ether employed in the example, there may be employed any saturated hydrocarbon containing between three and eight carbon atoms per molecule. Thus, there may be employed propane, cyclopropane, butane, isobutane, cyclobutane, pentane, isopentane, tertiary pentane, cyclopentane, hexane, (2-methyl pentane), (2,4-dimethyl butane), (2,2-dimethyl butane), cyclohexane, heptane, (2-methyl hexane), (1,1-diethyl propane), (3,3-dimethyl pentane), cycloheptane, octane, (2,3-dimethyl hexane), (2-methyl heptane), (2,2,3-trimethyl pentane), cyclooctane, etc. It will be realized, of course, that where hydrocarbons are employed which are gaseous at the temperature of operation under normal pressure, superatmospheric pressure will be resorted to in order to keep the saturated hydrocarbon in liquid state. Instead of using any of the aforesaid hydrocarbons singly, a mixture of several is contemplated. Thus, petroleum ether, naphtha, ligroin, or petroleum benzine may be employed, with petroleum ether, naphtha and petroleum benzine being preferred.

As stated heretofore, the ratio of hydrocarbon to hydrogenated rosin employed will be at least 1.0. Although there is no limit to the amount of hydrocarbon which may be employed, other than the aforesaid limitation that the ratio of hydrocarbon to hydrogenated rosin be at least 1.0, it is desirable to keep the hydrocarbon to hydrogenated rosin ratio below 20 inasmuch as the crystalline hydro rosin acids are sparingly soluble in the hydrocarbons and as the quantity of hydrocarbon employed is increased, there is less recovery of crystalline acids. It is not practical to employ a hydrocarbon to hydrogenated rosin ratio lower than 1.0 because under such a condition unhydrogenated rosin acids precipitate out in appreciable quantities and the product does not consist of substantially pure crystalline hydro rosin acids. Experiment has shown that the preferred range of hydrocarbon to hydrogenated rosin ratios to be employed in accordance with this invention is that between about 10 and about 1.3.

Agitation of the hydrocarbon in liquid state and the hydrogenated rosin may be carried out at a temperature from about −15° C. to about 200° C., and preferably from about 0° C. to about 100° C. The temperature used will depend somewhat on the particular saturated hydrocarbon employed. A temperature within the above broad range at which the hydrocarbon is in liquid state is utilized and superatmospheric pressure is resorted to whenever necessary to maintain the hydrocarbon in liquid form. A preferable temperature for carrying out the agitation will be the reflux temperature of the particular solution at the pressure utilized. The refluxing aids in the agitation and serves to maintain a relatively constant temperature. The pressure employed is not critical and may be varied in accordance with the hydrocarbon employed. The agitation will be continued until there is either no further dissolution of undissolved constituents or until there is produced a homogeneous solution. The undissolved constituents are crystalline hydro rosin acids.

A homogeneous solution with no undissolved constituents will generally only result when the solution is maintained at a relatively high temperature, as, for example, when petroleum ether is employed, a temperature above 70° C. This is due to the fact that at elevated temperatures the crystalline hydro rosin acids as well as the other constituents of hydrogenated rosin are soluble in the hydrocarbons employed herein. Hence, to separate the crystalline hydro rosin acids from a homogeneous solution, the solution will be cooled until the crystalline hydro rosin acids commence to crystallize out. Generally, it will be cooled to a temperature of about 30° C. or therebelow in order to induce crystallization. Ordinarily, the crystallization will occur spontaneously; however, it may be desired to seed the solution with, for example, a crystal of hydro rosin acids to induce crystallization. Other methods of inducing crystallization may be employed, as desired.

To finally recover the crystalline hydro rosin acids, a separation is made from the supernatant solution by any desirable means, such as, filtration, centrifuging or decantation. The separated crystalline acids may then be washed with additional quantities of the pure hydrocarbon, and dried to yield a substantially pure product. If desired, the product may be further purified by dissolving in a solvent, such as, acetone, carbon tetrachloride, dioxane, toluene, isopropyl alcohol, isopropyl ether, isopropyl acetate, etc. and treating with activated carbon, alumina, etc. Upon evaporating off the residual solvent, the purified crystalline hydro rosin acids remain.

The crystalline hydro rosin acids obtained as a result of the aforesaid processes are substantially colorless. On the rosin color scale they will be found to have color gradings averaging between X and X+. They are substantially completely stable to oxidation and decomposition. The products in the fused or resinous state range in melting point as determined by the ball and ring method between about 85° C. and about 100° C., and in acid number between about 180 and about 185. They are furthermore substantially insoluble at 20° C. in low boiling saturated hydrocarbons, particularly those containing between 3 and 8 carbon atoms per molecule. Physically, they may exist in the crystalline form or in the form of resinous solids.

As shown in the preceding example, the solution remaining after removal of the crystalline hydro rosin acids may be treated to recover an improved hydrogenated rosin having properties distinctly different from either the crystalline hydro rosin acids or the original hydrogenated rosin. In the example, the material was recovered by distilling off the hydrocarbon solvent. The solvent may, however, be removed by sparging with an inert gas, as nitrogen, $CO_2$, steam, etc.

This improved hydrogenated rosin possesses the truly remarkable property of being substantially free of any tendency to crystallize. This property is a very advantageous one inasmuch as the tendency of rosin and its derivatives to crystallize constitutes a serious drawback in many applications. Many of the applications of rosin and its derivatives depend upon the fact that they impart a tackiness to the composition involved. When crystallization sets in, the original tackiness disappears, and the composition shows an increasing tendency to become brittle.

The improved hydrogenated rosin of this invention characteristically maintains its original tackiness over long periods of time.

These improved hydrogenated rosins consist mainly of isomeric hydro rosin acids which show no tendency to crystallize, along with hydrogenated derivatives of the neutral bodies present in the original rosin. These hydrogenated rosins show good stability to oxidation and discoloration. They vary in drop melting point between about 60° C. and about 65° C., and in acid number between about 160 and about 165. The ash content of these hydrogenated rosins is substantially lower than that of the hydrogenated rosins from which they were derived. This results from the fact that any colloidal noble metal catalyst present in the original hydrogenated rosin follows the crystalline hydro rosin acids and is contained in the crystalline hydro rosin acids product obtained as described hereinbefore. The improved hydrogenated rosins are furthermore characterized in being completely soluble in saturated aliphatic hydrocarbons of between 3 and 8 carbon atoms.

The improved hydrogenated rosins, which are characterized by their lack of any tendency to crystallize, have a great variety of uses. They are particularly useful in the pressure sensitive adhesive field inasmuch as they have the property of retaining their original tack over long periods of time. These new hydrogenated rosins may also be used in rubber compounding and in the manufacture of pitches for containers for alcoholic beverages.

The crystalline hydro rosin acids prepared in accordance herewith have many applications where their tendency towards crystallization is not a disadvantage. They may be used in soaps, sizes, and in the preparation of ester gums. Both the crystalline hydro rosin acids and the improved hydrogenated rosins of this invention may be esterified with monohydric alcohols, such as, methyl, ethyl, propyl, etc. alcohols, and polyhydric alcohols, such as, ethylene glycol, diethylene glycol, triethylene glycol, glycerol, erythritol, hexitol, etc. The crystalline hydro rosin acids may be converted into acid chlorides by treatment with phosphorous trichloride or with thionyl chloride. The resulting chlorides are light in color and make possible derivatives which could not otherwise be obtained.

The methods of this invention provide many advantageous results. In addition to providing a means for separating crystalline hydro rosin acids from hydrogenated rosin, there is provided an improved hydrogenated rosin having interesting and useful properties. The process of separation is one which is economical and one which possesses practical operability. The methods furthermore provide a means of separating colloidal noble metal from hydrogenated rosin.

It will be realized that wherever in this specification and claims the percentage saturation of rosin is referred to, the figure given is on the basis of a rosin consisting entirely of rosin acids having a molecular weight of 302 with two double bonds per molecule.

This application forms a continuation-in-part of my application Serial No. 420,150, filed November 22, 1941.

What I claim and desire to protect by Letters Patent is:

1. A method for the separation of crystalline hydro rosin acids from a rosin which has been at least partially saturated with hydrogen to the extent of at least 25% of the double bonds in the presence of a noble metal catalyst, which consists of agitating said hydrogenated rosin in contact with a saturated hydrocarbon having between 3 and 8 carbon atoms per molecule, at a temperature from about −15° C. to about 200° C., utilizing a hydrocarbon to hydrogenated rosin ratio of at least about 1.0, then maintaining the system at a temperature which will induce crystallization, and thereafter separating the crystalline hydro rosin acids.

2. A method for the separation of crystalline hydro rosin acids from a rosin which has been saturated with hydrogen to the extent of at least 25% of the double bonds in the presence of a noble metal catalyst, which consists of agitating said hydrogenated rosin in contact with a saturated hydrocarbon having between 3 and 8 carbon atoms per molecule, at a temperature between about 0° C. and about 100° C., utilizing a hydrocarbon to hydrogenated rosin ratio of at least about 1.0, then maintaining the system at a temperature which will induce crystallization, and thereafter separating the crystalline hydro rosin acids.

3. A method for the separation of crystalline hydro rosin acids from a rosin which has been at least partially saturated with hydrogen to the extent of at least 25% of the double bonds in the presence of a noble metal catalyst, which consists of agitating said hydrogenated rosin in contact with petroleum ether, at a temperature between about −15° C. and about 200° C., utilizing a petroleum ether to hydrogenated rosin ratio of at least about 1.0, then maintaining the system at a temperature which will induce crystallization, and thereafter separating the crystalline hydro rosin acids.

4. A method for the separation of crystalline hydro rosin acids from a rosin which has been at least partially saturated with hydrogen to the extent of at least 25% of the double bonds in the presence of a noble metal catalyst, which consists of agitating said hydrogenated rosin in contact with naphtha, at a temperature between about −15° C. and about 200° C., utilizing a naphtha to hydrogenated rosin ratio of at least about 1.0, then maintaining the system at a temperature which will induce crystallization, and thereafter separating the crystalline hydro rosin acids.

5. A method for the separation of crystalline hydro rosin acids from a rosin which has been at least partially saturated with hydrogen to the extent of at least 25% of the double bonds in the presence of a noble metal catalyst, which consists of agitating said hydrogenated rosin in contact with petroleum benzine, at a temperature between about −15° C. and about 200° C., utilizing a petroleum benzine to hydrogenated rosin ratio of at least about 1.0, then maintaining the system at a temperature which will induce crystallization, and thereafter separating the crystalline hydro rosin acids.

6. A method for the separation of crystalline hydro rosin acids from a rosin which has been at least partially saturated with hydrogen to the extent of at least 25% of the double bonds in the presence of a noble metal catalyst, which consists of agitating said hydrogenated rosin in contact with petroleum ether, at a temperature between about 0° C. and about 100° C., utilizing a petroleum ether to hydrogenated rosin ratio between about 10 and about 1.3, then maintaining the system at a temperature low enough to induce crystallization, and thereafter separating the crystalline hydro rosin acids.

7. A method for the separation of crystalline hydro rosin acids from a rosin which has been at least partially saturated with hydrogen to the extent of at least 25% of the double bonds in the presence of a noble metal catalyst, which consists of agitating said hydrogenated rosin in contact with naphtha, at a temperature between about 0° C. and about 100° C., utilizing a naphtha to hydrogenated rosin ratio between about 10 and about 1.3, then maintaining the system at a temperature low enough to induce crystallization, and thereafter separating the crystalline hydro rosin acids.

8. A method for the separation of crystalline hydro rosin acids from a rosin which has been at least partially saturated with hydrogen to the extent of at least 25% of the double bonds in the presence of a noble metal catalyst, which consists of agitating said hydrogenated rosin in contact with petroleum benzine, at a temperature between about 0° C. and about 100° C., utilizing a petroleum benzine to hydrogenated rosin ratio between about 10 and about 1.3, then maintaining the system at a temperature low enough to induce crystallization, and thereafter separating the crystalline hydro rosin acids.

9. A method for the separation of crystalline hydro rosin acids from a rosin which has been at least partially saturated with hydrogen to the extent of at least 25% of the double bonds in the presence of a noble metal catalyst, which consists of agitating said hydrogenated rosin in contact with a saturated hydrocarbon having between 3 and 8 carbon atoms per molecule at a temperature from about −15° C to about 200° C., utilizing a hydrocarbon to hydrogenated rosin ratio of at least about 1.0, then maintaining the system at a temperature low enough to induce crystallization, then separating the crystalline hydro rosin acids, and thereafter recovering the non-crystallized hydrogenated rosin from the hydrocarbon solution.

WILLIAM J. KIRKPATRICK.